United States Patent [19]

Isak

[11] Patent Number: 4,909,423

[45] Date of Patent: Mar. 20, 1990

[54] CAR SERVING TRAY

[76] Inventor: Benis Isak, 9940 Floral Park La., Boca Raton, Fla. 33428

[21] Appl. No.: 179,212

[22] Filed: Apr. 8, 1988

[51] Int. Cl.[4] .............................. B60R 7/06; A47B 5/02
[52] U.S. Cl. .......................... 224/42.43; 224/42.45 R; 108/45; 108/135
[58] Field of Search ................... 224/29.5, 275, 42.42, 224/42.43, 42.44, 42.45 R, 42.46 R, 273, 277, 278; 296/37.1, 37.5, 37.8, 37.12, 37.13, 37.15, 37.16; 297/146, 191, 163; 108/42, 45, 44, 48, 134, 135; 248/236, 235; 211/90, 88, 186, 150

[56] References Cited

U.S. PATENT DOCUMENTS

| 124,811 | 3/1872 | Green | 108/48 |
|---|---|---|---|
| 1,582,380 | 4/1926 | Carpenter et al. | 297/163 |
| 1,951,261 | 3/1934 | Thompson | 108/45 |
| 2,015,976 | 10/1935 | Trepte et al. | 297/163 |
| 2,133,347 | 10/1938 | Fedeler | 211/90 |
| 2,584,646 | 2/1952 | Wagstaff | 224/42.43 |
| 2,720,436 | 10/1955 | Covey | 108/44 |
| 3,050,355 | 8/1962 | Hess et al. | 297/163 |
| 3,198,144 | 8/1965 | Cullinan | 108/48 |
| 4,619,386 | 10/1986 | Richardson | 224/42.43 |

FOREIGN PATENT DOCUMENTS 0139981  1/1951  Australia ............................ 297/163

Primary Examiner—Henry J. Recla
Assistant Examiner—J. Casimer Jacyna
Attorney, Agent, or Firm—Richard L. Miller

[57] ABSTRACT

This car serving tray is designed to be supported quickly and easily to the dashboard of an automobile. Primarily, it consists of a rectangular panel having a pair of hooks on one edge that will engage with a pair of hinge rods mounted to the dashboard, and an adjustable brace rod is provided and engages with a dashboard mounted bracket for support of the rear portion of the panel.

2 Claims, 1 Drawing Sheet

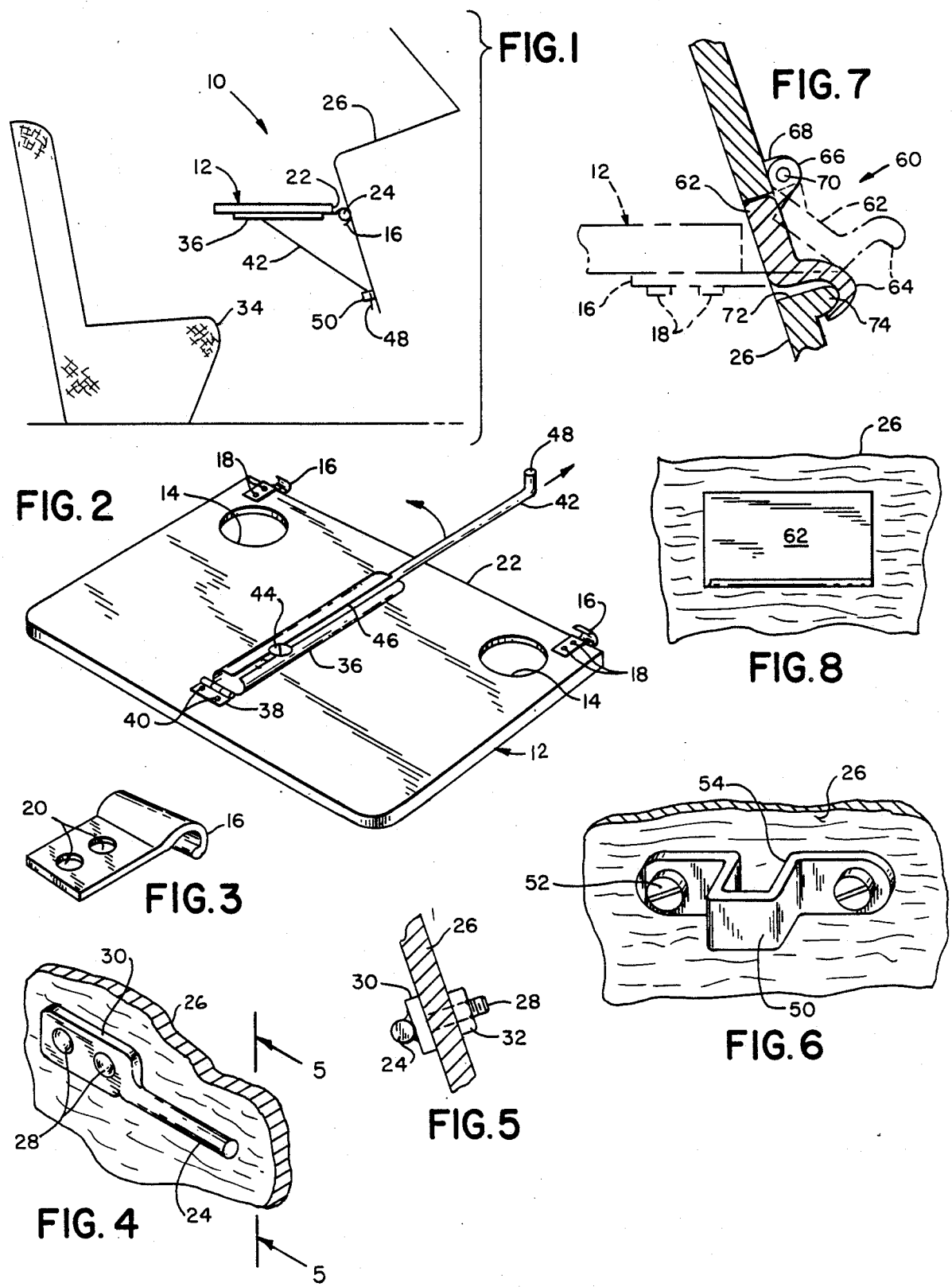

CAR SERVING TRAY

BACKGROUND OF THE INVENTION

The instant invention relates generally to automotive vehicle accessories, and more particularly, to a car serving tray.

Numerous devices have been provided in the prior art that are adapted to be employed in vehicles for food support. While these units may be suitable for the particular purpose to which they address, they would not be as suitable for the purpose of the present invention as hereafter described.

SUMMARY OF THE INVENTION

A primary object of the present invention is to provide a car serving tray that will overcome the shortcomings of the prior art devices.

Another object is to provide a car serving tray that will be of such design, as to be mounted in a vehicle and will fold away when not in use.

An additional object is to provide a car serving tray that will include releasable hooks for quick removal of the tray from its mounts.

A further object is to provide a car serving tray that is simple and easy to use.

A still further object is to provide a car serving tray that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures an the drawings are briefly described as follows:

FIG. 1 is a diagrammatic side view of the instant invention, shown in; use;

FIG. 2 is a diagrammatic bottom perspective view of the instant invention;

FIG. 3 is a perspective view of the hooks shown removed therefrom;

FIG. 4 is a fragmentary perspective view of one of the mounting supports, shown attached to the vehicle dashboard shown fragmentary;

FIG. 5 is a cross sectional view taken along line 5—5 of FIG. 4;

FIG. 6 is a perspective view of the brace receiving bracket of the tray, shown secured to the dashboard;

FIG. 7 is a vertical cross sectional view of a vehicle dashboard, showing a modified mounting support, with a tray hook shown installed therein in phantom; and FIG. 8 is a from elevational view of the modified mounting support, showing the tray removed therefrom.

DETAILED DESCRIPTION OF THE PREFERRED EMBODIMENTS

Turning now descriptively to the drawings, in which like reference characters denote like elements throughout the several views, a tray 10 is shown to include a rectangular panel 12 having an opening 14 extending through corner areas for the receiving and support of cups or glasses of beverages. A pair of hooks 16 are spaced apart, face downward, and receive fasteners 18 through their openings 20 that secures the hooks 16 to the edge portion 22 of the panel 12. Hooks 16 provide for removable engagement with the outer peripheral surfaces of hinge rods 24 that mount to dashboard 26 of an automotive vehicle. A flat rectangular portion 30 integrally attached to one end of the hinge rods 24, receives bolt fasteners 28 that receive nut fasteners 32 that hold hinge rods 24 to the vehicle dashboard 26.

When panel 12 is in horizontal position, its front slightly overhangs the front of the vehicle seat 34, and a channel member 36 is provided and is fixedly secured to one side of a hinge 38 that is secured to the bottom of panel 12 by fasteners 40. A brace rod 42 is provided and receives a set screw 44 that rides in slot 46 of channel 36 for forward and rearward adjustment of brace rod 42, and a lip 48 formed on another end of brace rod 42, provides for being received in a stop bracket 50 that is fastened to dashboard 26 by fasteners 52.

In use when it is desired to eat in a vehicle, panel 12 is employed to support the food and beverages by engaging the hooks 16 to the hinge rods 24, and the brace rod 42 is placed in the opening 54 of the stop bracket 50. The set screw 44 is then tightened to render brace rod 42 secure in the channel member 36, and when the occupant of the vehicle has finished eating, panel 12 is merely lifted from the hinge brackets 24 and is stored under seat 34 or elsewhere.

It shall also be recognized that panel 12 may serve as a writing surface when desired.

Referring now to FIGS. 7 and 8, a modified mounting 60 is shown to include a hook plate 62 having an integrally attached hook 64 on a bottom edge. A pair of projections 66, (one of which is shown), are pivotally secured to a pair of mounting brackets 68, (one of which is shown), and a pivot pin 70 is secured within each projection 66 and bracket 68, enabling hook plate 62 to descend down by gravity into opening 72 when panel is not in use. When plate 62 descends downward, the hook 64 engages with a lip 74 that projects rearward and is integrally attached to dashboard 26, and lip 4 serves as a stop against further travel of hook plate 62.

Panel 12 functions in the same manner as was above described in the first embodiment of the invention, with the exception, that the hooks 16 now engage with the lip 74 formed in the dashboard 26.

In use, the modified mounting 60 is employed, by the panel 12 being urged forward with its hooks 16 against plate 62, which pushes hook plate 62 inward of opening 72. The panel 12 is then urged downward and towards the user and causes the hooks 16 to engage with the lip 64. After the above, the brace rod 42 is secured in the same manner as was afore described of the first embodiment.

When panel 12 is no longer being used, the reverse procedure of the above is effected and the tray is suitably stored. After removal of the tray from the dash board plate 62 closes so as to present a more pleasing appearance.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A car serving tray assembly for a dashboard of an automobile comprising:
   a pair of hinge rods each having a rod portion extending laterally from a rectangular flat plate, said rod portion and flat plate being of one-piece construction and each of said flat plates adapted to be secured in spaced apart relation on a dashboard with said rod portions aligned in a common horizontal plane and bracket means defining a socket aperture adapted to be secured on the dashboard at a location below and medially between said hinge rods;
   a tray panel assembly comprising a panel having opposite front and rear edge portions;
   a pair of hooks secured to the front edge portion of the panel a spaced apart relation corresponding to the spacing apart of the hinge rods for removable engagement with said hinge rods;
   a brace rod assembly comprising:
   a brace rod having a hooked free end and an opposite end receiving a set screw;
   a channel member secured at one end to a hinge secured to the panel at a location adjacent a rear edge portion thereof and medially between said hooks and an opposite end receiving a set screw, the brace rod being slidably received in said channel member and adjustable in position therein by operation of the set screw;
   whereby, when the hooks are engaged about the hinge rods adjustment of the position of the brace rods in the channel with pivotal adjustment of the hinge enables the hooked free end of the brace rod to be engaged in the bracket aperture to mount the tray panel assembly to the dashboard with the panel extending horizontally from the dashboard, the brace rod being collapsible against the panel when the tray panel assembly is removed from the dashboard.

2. A car serving tray assembly as set forth in claim 1 wherein the channel member is formed as a one-piece sleeve substantially completely enclosing the periphery of the brace rod.

* * * * *